Patented Nov. 17, 1953

2,659,718

UNITED STATES PATENT OFFICE 2,659,718

TREATMENT OF RESIN ACID-FATTY ACID MIXTURES

Owen S. Eckhardt, Columbia, Miss., Don F. Cook, South Bend, Ind., and Ismond E. Knapp, Columbia, Miss., assignors to Leach Brothers, Inc., a corporation of Wisconsin No Drawing. Application August 22, 1951, Serial No. 243,174

17 Claims. (Cl. 260—97.5)

Our invention relates to the treatment of resin acid-higher molecular weight fatty acid mixtures for the purpose of inhibiting the crystallization of the resin acids therefrom, such resin acids being typified by 1-abietic acid, 1-pimaric acid, and/or other resin acids capable of being isomerized to 1-abietic acid. It relates, also, to novel products which are obtained through the practice of the present invention, said products being essentially free of the tendency of the resin acids to crystallize therefrom. Our invention is particularly applicable to the treatment of mixtures of resin acids and higher molecular weight fatty acids derived from tall oil and the invention will be particularly described in relation thereto.

In the processing of tall oil, many procedures have been suggested for separating the higher molecular weight fatty acids from the resin acids but, commercially, many difficulties are encountered in efforts to effect a clean separation of the two types of acids. In almost all of such processes, the resin acids portion is recovered in the form of a mixture containing a predominant proportion of resin acids together with a variable but substantial amount of fatty acids. Such mixtures usually contain from about 5% to as high as about 35% of higher molecular weight fatty acids. Ordinarily, the mixtures comprise semi-solid pastes in which the resin acids have crystallized. Such mixtures are difficult to handle. They are, generally, too soft to be handled as solids and, unless they are held at a temperature higher than the melting point of the resin acids, they cannot be pumped or otherwise handled as a liquid. The readiness with which the resin acids crystallize from such mixtures limits their industrial uses and greatly lowers their otherwise potential commercial value.

In accordance with our invention, resin acid-higher molecular weight fatty acid mixtures, of the type described above, are treated in the manner described below whereby the crystallization of the resin acids is inhibited. Products made in accordance with our invention have been stored for many months without the occurrence of any crystallization of the resin acids and, so far as we are aware, such products may be stored practically indefinitely without the occurrence of resin acids crystallization.

The new and useful products which result from the practice of our invention have a wide number of uses in a variety of industries. Thus, for example, they can be effectively employed in the production of core oils. Another important use is in the preparation of varnishes and other protective coatings. Thus, for instance, the products may be reacted, at elevated temperatures, for example, of the order of 150 degrees C. to 200 degrees C., with appropriate proportions of maleic anhydride or other $\alpha,\beta$-unsaturated dicarboxylic acids, or with heat-reactive phenolic resins, followed, if desired, by esterification with ethylene glycol, diethylene glycol, glycerol, polyglycerols, as well as other polyhydric alcohols or mixtures thereof.

In accordance with our invention, the resin acids-higher molecular weight fatty acid mixtures are initially esterified with a mono-, di-, or polyhydric alcohol, and then the resulting mixture of resin acids and fatty acid esters is reacted with a relatively small proportion of formaldehyde or a material which, under the conditions of the reaction, as described below, releases formaldehyde. The esterification reaction with the alcohol is carried out in such a manner that essentially only the higher molecular weight fatty acids are esterified. To this end, an amount of alcohol is utilized which is substantially stoichiometrically equivalent to the content of fatty acids in the resin acids-higher molecular weight fatty acid mixture. While an excess of alcohol can be utilized without detrimental effect, as a general rule no such excess is required. Where low boiling alcohols are used, for example, methyl alcohol, it may be advisable, in accordance with known esterification procedures, to utilize an excess of such alcohol over the stoichiometric amount necessary to esterify the fatty acids. The esterification reaction is also carried out at a temperature below that at which esterification of the resin acids occurs. In general, we prefer to carry out the esterification at an elevated temperature but not substantially exceeding approximately 200 degrees C. At materially higher temperatures, as, for example, in the range of 260 to 285 degrees C. or higher, not only does esterification of the resin acids tend to occur but, in addition, there is a possibility of occurrence of partial decarboxylation of the 1-abietic acid in the resin acids portion of the mixture. In general, for best results, such a change in the molecular structure of the resin acids should be avoided since the subsequent treatment with formaldehyde would not result in obtaining the full beneficial effects of the treatment therewith so far as our present invention is concerned. A good working range of temperatures for the esterification reaction, where di- and polyhydric alcohols (hereafter denoted generally by the term "polyhydric alcohols") are utilized, is about 150 degrees C.

to 200 degrees C. In the case where lower boiling alcohols are used, for example, such monohydric alcohols as methyl alcohol and ethyl alcohol, it will be understood, of course, that lower esterification temperatures are employed, generally in the range of about 90 to 100 degrees C. In the usual case, operating at atmospheric pressures, the esterification reaction is completed in a few hours, usually of the order of about 3 to about 4 hours. The esterification reaction may be accelerated, if desired, by adding a small percentage, usually a fraction of a per cent, of an esterification catalyst, usually an acid catalyst such as p-toluene sulfonic acid.

A wide variety of alcohols can be employed, typical examples of monohydric alcohols being methyl alcohol, ethyl alcohol, propyl alcohol, isopropyl alcohol, butyl alcohol, and the like; and, among the polyhydric alcohols which can be utilized, are, by way of example, ethylene glycol, propylene glycol, diethylene glycol, triethylene glycol, tetraethylene glycol, and other glycols and polyglycols, glycerol, polyglycerols, pentaerythritol, dipentaerythritol and polypentaerythritols, sugar alcohols such as sorbitol, mannitol, dulcitol and arabitol and the like, and mixtures of any two or more of said alcohols. We find that, in the usual case, ethylene glycol and glycerol are particularly satisfactory.

After the esterification reaction has been carried out, the resulting product is then reacted with formaldehyde or a material which, under the conditions of the reaction, releases formaldehyde, as for example, paraformaldehyde. The term formaldehyde, as used hereafter, will be understood to encompass generically not only formaldehyde but, as stated, materials which, under the conditions of the reaction, release formaldehyde. Only a small proportion, by weight, of formaldehyde is utilized in the reaction. In general, such amounts will fall within the range of about 2 or 3% to about 6%. On the basis of the resin acids content of the resin acids-fatty acid ester mixture with which the formaldehyde is reacted, the proportions of formaldehyde will usually run in the range of about 4% to about 12%, by weight, of said resin acids. The temperature at which the reaction with the formaldehyde is carried out is somewhat elevated, generally falling within the range of about 160 to about 210 degrees C. with a temperature of about 180 to about 190 degrees C. being preferred in most cases. Temperatures somewhat below 160 degrees C. and somewhat above 210 degrees C. can be utilized but it is preferred to operate within the temperature ranges set forth above.

In view of the elevated temperatures at which the reaction with the formaldehyde is carried out, it is, generally speaking, difficult and cumbersome to utilize the formaldehyde in the form of an aqueous solution as, for example, the conventional formalin. Unless the reaction with aqueous formaldehyde is carried out in a pressure system, which introduces a number of difficulties, particularly with respect to problems of equipment and handling of materials, attempts to use ordinary aqueous solutions of formaldehyde result in relatively large losses of the formaldehyde. The water vaporizes at contact with the hot reaction mixture and, at the same time, a large proportion of the formaldehyde escapes as a gas in the steam which is formed with the result that only a small proportion of the formaldehyde is available for use in the reaction. It is advantageous, therefore, to utilize the formaldehyde in the form of its solid polymer, namely, paraformaldehyde. As it is ordinarily obtained in commerce, paraformaldehyde is a powder. While the powder can be employed, we have found that when it is added to the resin acids-fatty acid ester mixtures, at the elevated temperatures at which the reaction is to be carried out, the paraformaldehyde powder tends to float on the surface with the result that a relatively large proportion of the paraformaldehyde depolymerizes and a good deal of it escapes as a gas without entering into the reaction.

For the most effective economical operations, therefore, the paraformaldehyde should be used in the form of flakes or granules and it should be added slowly to the molten resin acids-fatty acid ester mixtures with relatively rapid agitation. Preferably, the agitator in the reaction vessel should be of the type to draw the paraformaldehyde flakes downwardly into the molten mass well below the surface thereof so that, as depolymerization takes place, the formaldehyde which is formed bubbles through a considerable depth of the molten mass and, in so doing, there is sufficient time and adequacy of contact between the formaldehyde and the resin acids-fatty acid ester mixtures to obtain adequate and substantial reaction therebetween. It is unnecessary to carry out the reaction under pressure since, under the conditions described, the reaction proceeds smoothly and rapidly at atmospheric pressure.

The following examples are illustrative of the practice of our invention. It will be understood that such examples are in nowise intended to be limitative of the full scope of our invention since various changes can be made with respect to the sources of resin acids-fatty acid mixtures; materials which, under the conditions of the reaction, release formaldehyde; alcohols or mixtures thereof which are utilized in the esterification reaction; proportions of reactants, temperatures, times of heating and the like, without departing from the spirit of our invention in the light of the guiding principles which we disclose here. All parts set forth in the examples are by weight.

*Example 1*

200 parts of a semi-solid crystalline material obtained from tall oil, having an acid number of 185 and containing approximately 65% resin acids, approximately 30% fatty acids, and approximately 5% unsaponifiable matter (sold under the trade name "Aliphat 45B"), was placed in a vessel with an agitator, a thermometer, a gas inlet pipe, and an outlet to a condenser. Then, 7 parts of ethylene glycol was added and the mixture was heated to 160 degrees C. under a blanket of carbon dioxide. The mass was held at 160 degrees C. to 200 degrees C. for 3 hours with agitation. At the end of this heating period the acid number had dropped to 122 indicating that the fatty acids were substantially completely esterified, a small portion of the resin acids also being esterified. Then, 6 parts of paraformaldehyde flakes was added slowly during 1 hour at 180 degrees C. with vigorous agitation under a blanket of carbon dioxide. After holding at 180 degrees C. for an additional hour the batch was removed from the vessel. The product was a straw colored balsam-like liquid having a very high viscosity, greater than 500 poises. The acid number of the product was 120, showing virtually no change during the formaldehyde treatment. Examination in an ultra violet spectrophotometer showed the essentially same content of conjugated double bonds in the product as in the original material. No crystallization occurred in this product when it was held at room temperature for several months.

*Example 2*

Using a reaction vessel similar to that used in Example 1, 200 parts of "Aliphat 45B" was reacted with 7 parts of glycerine under a blanket of carbon dioxide in the presence of 0.5 part of p-toluene sulfonic acid for 3.5 hours while slowly raising the temperature from 150 degrees C. to 200 degrees C. Then, 8 parts of paraformaldehyde flakes was added slowly during 30 minutes and the mass was stirred an additional hour at 180 degrees C. to 190 degrees C. The product was a brownish yellow balsam-like oil having a very high viscosity (over 500 poises) and an acid number of 105. It showed no crystallization on standing at room temperature for several months.

*Example 3*

200 parts of a tall oil, which had "sugared" very badly due to crystallization of the resin acids, and which showed on analysis approximately 45% resin acids and 45% fatty acids, was placed in the same type of reaction vessel used in Example 1 and 10 parts of ethylene glycol was added. The mixture was heated at 170 degrees C. to 190 degrees C. for 4 hours with agitation, and then 6 parts of paraformaldehyde flakes was added during 30 minutes at 180 degrees C. to 190 degrees C. and the mass was stirred an additional hour. The product was a brown oil having an acid number of 74 and a viscosity of Z on the Gardner-Holt scale, equivalent to approximately 23 poises. It showed no crystallization on standing at room temperature for several months.

*Example 4*

To 200 parts of an "Aliphat 45B," which analyzed approximately 76% resin acids and approximately 22% fatty acids, there was added 30 parts of anhydrous methanol together with 0.6 part of p-toluene sulfonic acid. The solution was heated with agitation for 3 hours at a temperature of 90 degrees C. to 95 degrees C. At this temperature the excess methanol refluxed vigorously. At the end of this heating period the reflux condenser was turned down and the excess methanol was distilled off while raising the temperature to 160 degrees C. The mass was sparged for a few minutes at 160 degrees C. to remove the last of the methanol. Then, 8 parts of paraformaldehyde flakes was added slowly during 1 hour while raising the temperature to 180 degrees C. After holding the temperature at 180 degrees C. for an additional hour the batch was removed. The product was a straw-colored balsam-like liquid having a viscosity of approximately 500 poises and an acid number of 134. This acid number is slightly lower than would be expected from the esterification of the fatty acids only, which indicates that not only were the fatty acids completely esterified but, in addition, a small percentage of the resin acids was also esterified.

The novel products of our present invention, as has been pointed out above, are free or essentially free of the tendency of the resin acids to crystallize therefrom. The products comprise mixtures of fatty acid esters with mono- or polyhydric alcohols, depending upon the selection of the particular alcohol used in the esterification reaction, with resin acid-formaldehyde reaction products. The preferred products of our invention comprise a mixture of at least 30%, by weight, of higher molecular weight fatty acid esters of aliphatic polyhydric alcohols with a greater proportion of the resin acid-formaldehyde reaction product. In general, the particularly preferred products of our invention comprise those wherein the resin acid-formaldehyde reaction product comprises between about 40% and about 95%, by weight, of the product.

What we claim as new and desire to protect by Letters Patent of the United States is:

1. In a method for inhibiting the crystallization of resin acids in mixtures of resin acids and higher molecular weight fatty acids derived from tall oil, the steps which comprise reacting said mixtures with a lower molecular weight aliphatic alcohol to esterify at least the major proportion of the fatty acids present in said mixtures, and then heating said reaction product with from about 4% to about 12%, by weight, of formaldehyde, based on the weight of the resin acids.

2. In a method for inhibiting the crystallization of resin acids in mixtures of resin acids and higher molecular weight fatty acids derived from tall oil, the steps which comprise reacting said mixtures with an amount of a lower molecular weight aliphatic alcohol sufficient to esterify substantially all of the higher molecular weight fatty acids present in said mixtures, and then heating said reaction product with from about 4% to about 12%, by weight, of formaldehyde, based on the weight of the resin acids.

3. In a method for inhibiting the crystallization of resin acids in mixtures of resin acids and higher molecular weight fatty acids derived from tall oil, the steps which comprise reacting said mixtures with an amount of a lower molecular weight aliphatic alcohol sufficient to esterify substantially all of the higher molecular weight fatty acids present in said mixtures, said reaction being carried out at an elevated temperature but not substantially exceeding about 200 degrees C., and then heating said reaction product with from about 4% to about 12%, by weight, of formaldehyde, based on the weight of the resin acids, at a temperature in the range of about 160 to about 210 degrees C.

4. In a method for inhibiting the crystallization of resin acids in mixtures of resin acids and higher molecular weight fatty acids derived from tall oil, the steps which comprise reacting said mixtures with an amount of a lower molecular weight aliphatic polyhydric alcohol sufficient to esterify substantially all of the higher molecular weight fatty acids present in said mixtures, said reaction being carried out at an elevated temperature but not substantially exceeding about 200 degrees C., and then heating said reaction product with from about 4% to about 12%, by weight, of formaldehyde, based on the weight of the resin acids, at a temperature in the range of about 160 to about 210 degrees C.

5. A method in accordance with claim 4, wherein the polyhydric alcohol is a dihydric alcohol.

6. A method in accordance with claim 5, wherein the dihydric alcohol is a water-soluble glycol.

7. A method in accordance with claim 4, wherein the polyhydric alcohol is glycerine.

8. In a method for inhibiting the crystallization of resin acids in mixtures of resin acids and higher molecular weight fatty acids derived from tall oil, the steps which comprise reacting said mixtures with an amount of a lower molecular weight aliphatic monohydric alcohol sufficient to esterify at least the major proportion of the higher molecular weight fatty acids present in said mixtures, and then heating said reaction product with from about 4% to about 12%, by weight, of formaldehyde, based on the weight of the resin acids, at a temperature in the range of about 160 to about 210 degrees C.

9. A method in accordance with claim 8, wherein the monohydric alcohol is methyl alcohol.

10. A new and improved product, essentially free of the tendency of resin acids to crystallize therefrom, said product comprising the reaction mixture resulting from esterifying the higher molecular weight fatty acids present in tall oil acids with an aliphatic polyhydric alcohol, said product comprising a mixture of at least 30%, by weight, of said higher molecular weight fatty acid esters of lower molecular weight aliphatic polyhydric alcohols, with a greater proportion of a resin acid-formaldehyde reaction product in which the formaldehyde is reacted with the resin acids in proportions in the range of about 4% to about 12% of the weight of said resin acids.

11. A new and improved product, essentially free of the tendency of resin acids to crystallize therefrom, said product comprising the reaction mixture resulting from esterifying the higher molecular weight fatty acids present in tall oil with a lower molecular weight aliphatic dihydric alcohol, said product comprising higher molecular weight fatty acid esters of said aliphatic dihydric alcohol, with a greater proportion of a resin acid-formaldehyde reaction product in which the formaldehyde is reacted with the resin acids in proportions in the range of about 4% to about 12% of the weight of said resin acids.

12. A product in accordance with claim 11, wherein the aliphatic dihydric alcohol is a water-soluble glycol.

13. A new and improved product, essentially free of the tendency of resin acids to crystallize therefrom, said product comprising the reaction mixture resulting from esterifying the higher molecular weight fatty acids present in tall oil with glycerine, said product comprising higher molecular weight fatty acid esters of gylcerine, with a greater proportion of a resin acid-formaldehyde reaction product in which the formaldehyde is reacted with the resin acids in proportions in the range of about 4% to about 12% of the weight of said resin acids.

14. A new and improved product, essentially free of the tendency of resin acids to crystallize therefrom, said product comprising the reaction mixture resulting from esterifying at least the major proportion of the higher molecular weight fatty acids present in tall oil acids with a lower molecular weight aliphatic alcohol and reacting said reaction mixture with from about 4% to about 12%, by weight, of formaldehyde, based on the weight of the resin acids.

15. A new and improved product, essentially free of the tendency of resin acids to crystallize therefrom, said product comprising the reaction mixture resulting from esterifying at least the major proportion of the higher molecular weight fatty acids present in tall oil acids with a lower molecular weight aliphatic polyhydric alcohol and reacting said reaction mixture with from about 4% to about 12%, by weight, of formaldehyde, at a temperature in the range of about 160 to about 210 degrees C., based on the weight of the resin acids, said product containing upwards of 40% unesterified resin acids.

16. A new and improved product, essentially free of the tendency of resin acids to crystallize therefrom, said product comprising the reaction mixture resulting from esterifying at least the major proportion of the higher molecular weight fatty acids present in tall oil acids with a lower molecular weight aliphatic monohydric alcohol and reacting said reaction mixture with from about 4% to about 12%, by weight, of formaldehyde, at a temperature in the range of about 160 to about 210 degrees C., based on the weight of the resin acids, said product containing from about 40% to about 95% unesterified resin acids.

17. A product in accordance with claim 15, wherein the polyhydric alcohol is ethylene glycol.

OWEN S. ECKHARDT.
DON F. COOK.
ISMOND E. KNAPP.

References Cited in the file of this patent
UNITED STATES PATENTS

| Number | Name | Date |
|---|---|---|
| 2,084,213 | Osterhof | June 15, 1937 |
| 2,398,312 | Jennings | Apr. 9, 1946 |
| 2,572,071 | St. Clair et al. | Oct. 23, 1951 |